United States Patent [19]

Kusakabe

[11] Patent Number: 5,299,946
[45] Date of Patent: Apr. 5, 1994

[54] MULTIPOLAR ELECTRICAL CONNECTOR

[75] Inventor: Toshihito Kusakabe, Ibarki, Japan

[73] Assignee: Hosiden Corporation, Yao, Japan

[21] Appl. No.: 65,066

[22] Filed: May 24, 1993

[30] Foreign Application Priority Data

Jul. 31, 1992 [JP] Japan .............................. 4-53910[U]

[51] Int. Cl.⁵ .......................................... H01R 13/00
[52] U.S. Cl. .................................................. 439/159
[58] Field of Search ................................. 439/152–160

[56] References Cited

U.S. PATENT DOCUMENTS

| | | | |
|---|---|---|---|
| 5,051,101 | 9/1991 | Komatsu | 439/159 |
| 5,139,435 | 8/1992 | Komatsu | 439/159 |
| 5,197,894 | 5/1993 | Koike | 439/159 |

*Primary Examiner*—Joseph H. McGlynn
*Attorney, Agent, or Firm*—Jones, Tullar & Cooper

[57] ABSTRACT

The multipolar electrical connector according to the present invention is adapted to give a pleasant click feel when a memory card C set in the connector is pushed out by a card ejecting mechanism, and also adapted to prevent the component elements of the card ejecting mechanism from being freely moved to prevent an unpleasant collision noise from being produced while no memory card is being set in the connector. The card ejecting mechanism comprises (i) a projecting piece 84 having a mountain-shape expanding portion 85, which is formed at a lever 8 connected to a cam 7, and (ii) a portion to be engaged 54a formed at the side of the connector body 1, the portion to be engaged 54a being adapted to overlap or be engaged with the mountain-shape expanding portion 85 when the lever 8 is moved. When the lever 8 is moved in the rearward direction B, the portion to be engaged 54a overlaps the mountain-shape expanding portion 85, and when the lever 8 is moved in the forward direction A, the mountain-shape expanding portion 85 is moved forward of the portion to be engaged 54a so that the projecting piece 84 is momentarily resiliently reset and engaged 25 with the portion to be engaged 54a.

12 Claims, 9 Drawing Sheets

MULTIPOLAR ELECTRICAL CONNECTOR

BACKGROUND OF THE INVENTION

1. Field of the Invention

The present invention relates to a multipolar electrical connector (hereinafter referred to as multipolar connector) for connecting multipolar contacts of a card which belongs to the field of IC memory cards or the like, to multipolar contacts of a computer or the like.

2. Description of the Prior Art

Recently, it is increasingly demanded to miniaturize a computer and its relevant device using a card of the type above-mentioned. In this connection, the multipolar connector is also required to be as thin as 5 to 6 mm. In such a thin multipolar connector, a card ejecting mechanism is often disposed to enhance the maneuverability for rearwardly pushing and removing the card which has been set in the connector.

A thin multipolar connector having a card ejecting mechanism is known in U.S. Pat. No. 5,139,435. The multipolar connector in U.S. Pat. No. 5,139,435 comprises: a connector body having a contact-piece group; guides rearwardly extending from the connector body at the ends of both lateral sides thereof; a reinforcing plate-like frame extending between the left- and right-hand guides at the undersides thereof; a lever disposed along one of the guides and movable in the back to forth direction of the connector; and a card pushing cam pin-connected to the connector body, a predetermined portion of the cam being relatively rotatably connected to the front end of the lever.

In this multipolar connector, the card ejecting mechanism comprises the lever and the cam. This ejecting mechanism is operated in the following manner. When the lever is forwardly pushed to rotate the cam, a card pushing portion of the cam is rearwardly moved. Accordingly, the front end of the card which has been set in the connector, is rearwardly pushed by the card pushing portion, so that a contact-piece group of the card is separated from the contact-piece group of the connector body, causing the card to be rearwardly pushed out.

In a portable electronic device such as a portable personal computer on which such a thin multipolar connector is mounted, when a card is not being set to the connector (when a card is not yet inserted thereinto), the lever forming the ejecting mechanism is movable in the back and forth direction of the connector and the cam is swingable around the pin-connection part thereof. Accordingly, while the user carries the electronic device, the device may be vibrated so that the lever is freely moved in the back and forth direction of the connector or the cam is freely swung. This disadvantageously produces an unpleasant clacking noise.

Further, when the lever is forwardly pushed with the hand to push out the card rearwardly, only a dull feel is transmitted to the hand through the cam and the lever at the time when the contact-piece group of the card is separated from the contact-piece group of the connector body. This presents the problem that the ejecting mechanism cannot meet the requirement for a cheerful click feel at the time when the card is pushed out.

In a multipolar connector to be used for a card such as an IC memory card, it is desired to take a measure for preventing the electronic parts mounted on the card from being damaged by static electricity. Such trouble can be solved by discharging static electricity charged on the card from the earth terminals thereof to the printed circuit board or the like through the earth terminals of the multipolar connector. In order to provide the thin multipolar connector discussed in the opening paragraph with such static electricity discharging function, the plate-like frame extending between the left- and right-hand guides at the undersides thereof, is provided on the flat-plate portion thereof with earth contact pieces, and these earth contact pieces are adapted to come in contact with earth-terminal corresponding portions of the card at the underside thereof.

However, when there is adopted, as a measure for providing a thin multipolar connector with a static electricity discharging function, the arrangement that the earth contact pieces formed at the flat-plate portion of the plate-like frame are adapted to come in contact with the earth-terminal corresponding portions of the card at the underside thereof, the following problem is presented. That is, when the card is inserted in or removed from such a multipolar connector, the underside of the card is rubbed against the earth contact pieces of the multipolar connector, so that the coating of the underside of the card may come off.

SUMMARY OF THE INVENTION

In view of the problems above-mentioned, the present invention is proposed.

It is an object of the present invention to provide a multipolar connector adapted to give the user a pleasant click feel when the card set therein is pushed out, merely by disposing a single member on the lever in a multipolar connector known as disclosed in U.S. Pat. No. 5,139,435.

It is another object of the present invention to provide a multipolar connector free from an unpleasant noise which may be produced when a card is not yet inserted thereinto.

It is a further object of the present invention to provide a multipolar connector which involves no likelihood that the coating of the underside of a card comes off, even though the multipolar connector has a static electricity discharging function with the use of a plate-like frame.

The present invention provides a multipolar connector having: a connector body; a contact-piece group disposed in the connector body; left- and right-hand guide members respectively projecting from the left- and right-hand ends of the connector body in the rearward direction of the connector; guide grooves formed in the left- and right-hand guide members and adapted to guide, in the back and forth direction of the connector, a card with the lateral edges thereof fitted in the guide grooves, the card being provided at the front end thereof with a contact-piece group corresponding to the contact-piece group of the connector; and a frame disposed as extending between the left- and right-hand guide members at the undersides thereof, and the present invention is characterized by comprising: a cam swingably pin-connected to the connector body; a card pushing portion formed at a part of the cam and adapted to go in and out from a position of the front end side of a card setting space between the left- and right-hand guide members when the cam is swung; a lever disposed along one of the left- and right-hand guide members and having the front end rotatably connected to the cam at other part thereof than the first-mentioned part; a lever holding portion formed at the one guide member along which the lever extends, the intermediate portion of the lever being slidably fitted in the lever holding portion; an engaging portion disposed at the side of the lever and having a projecting piece and a mountain-shape expanding portion formed at the front end of the projecting piece; and a portion to be engaged disposed at the side of the lever holding portion, the portion to be engaged being adapted such that, when the lever is pushed out in the rearward direction, the portion to be engaged overlaps the expanding portion, causing the projecting piece to be resiliently displaced and that, when the lever is pushed in the forward direction, the overlapping state of the portion to be engaged on the expanding portion is released to allow the projecting piece to be resiliently reset.

According to the present invention, the engaging portion having the projecting piece and the expanding portion may be disposed at the side of the lever holding portion, and there may be disposed, at the side of the lever, the portion to be engaged adapted such that, when the lever is pushed out in the rearward direction, the expanding portion overlaps the portion to be engaged, causing the projecting piece to be resiliently displaced and that, when the lever is pushed in the forward direction, the overlaping state of the expanding portion on the portion to be engaged is released to allow the projecting piece to be resiliently reset.

According to the multipolar connector having the arrangement above-mentioned, when the card pushing portion of the cam projects in the position of the front end side of the the card setting space and a card is set as pushed in the card setting space in the forward direction of the connector, the front end surface of the card pushes the card pushing portion in the forward direction to rotate the cam. Accordingly, the card pushing portion is moved in the forward direction from the position of the front end side of the card setting space, causing the lever to be pushed out in the rearward direction. At this time, the portion to be engaged overlaps the expanding portion of the engaging portion and the projecting piece is resiliently displaced.

When the card is being set in the connector and the lever is pushed in the forward direction to rotate the cam, the card pushing portion of the cam projects into the position of the front end side of the card setting space so that the front end surface of the card is pushed in the rearward direction to cause the card to be pushed out in the rearward direction. When the lever is pushed in the forward direction, the overlaping state of the portion to be engaged on the expanding portion is released to allow the projecting piece to be resiliently reset. While the portion to be engaged overlaps the expanding portion of the engaging portion, the projecting piece of the engaging portion is resiliently displaced. Accordingly, at the moment that the overlaping state of the portion to be engaged on the expanding portion is released, the projecting piece of the engaging portion is resiliently reset. Such momentary resilient resetting of the projecting piece is transmitted, as a click feel (sound or shock), to the hand through the lever.

Thus, according to the present invention, a pleasant click feel can be obtained when the card is pushed out, merely by providing the ejecting mechanism with a single member, i.e., the engaging portion.

In a multipolar connector according to the present invention, the engaging portion and the portion to be engaged form a locking mechanism arranged such that, when the lever is pushed out in the rearward direction, at least one of the engaging portion and the portion to be engaged is resiliently displaced and overlaps the other portion, and that, when the lever is pushed in the forward direction, the overlaping state is released so that at least one of the engaging portion and the portion to be engaged is resiliently reset and engaged with the other portion.

According to the multipolar connector having the arrangement above-mentioned, the engaging portion and the portion to be engaged are engaged with each other to prevent the lever from being moved in the back and forth direction of the connector. This prevents the lever and the cam from being freely moved, thus producing no unpleasant clacking noise.

The present invention also provides a multipolar connector having: a connector body; a contact-piece group disposed in the connector body; left- and right-hand guide members respectively projecting from the left- and right-hand ends of the connector body in the rearward direction of the connector; guide grooves formed in the left- and right-hand guide members and adapted to guide, in the back and forth direction of the connector, a card with the lateral edges thereof fitted in the guide grooves, the card being provided at the front end thereof with a contact-piece group corresponding to the contact-piece group of the connector; and a frame disposed as extending between the left- and right-hand guide members at the undersides thereof, and the present invention is characterized by comprising: projecting pieces upwardly standing from the lateral edges of the frame; and earth contact pieces so formed at the projecting pieces as to project into a card setting space between the left- and right-hand guide members from the lateral sides of the card setting space, the earth contact pieces being adapted to come in contact with earth terminals of a card at the lateral sides thereof.

According to the multipolar connector having the arrangement above-mentioned, the earth terminals at the lateral sides of a card pushed in the card setting space, are adapted to come in contact with the earth contact pieces which are disposed at the frame through the projecting pieces and which project into the card setting space from the lateral sides thereof. Thus, the present invention can provide a multipolar connector which involves no likelihood that the coating of the underside of a card comes off, even though the multipolar connector has a static electricity discharging function with the frame thereof utilized.

Other features and effects of the present invention will be further apparent from the following description.

DETAILED DESCRIPTION OF THE PREFERRED EMBODIMENT

Figure 4:
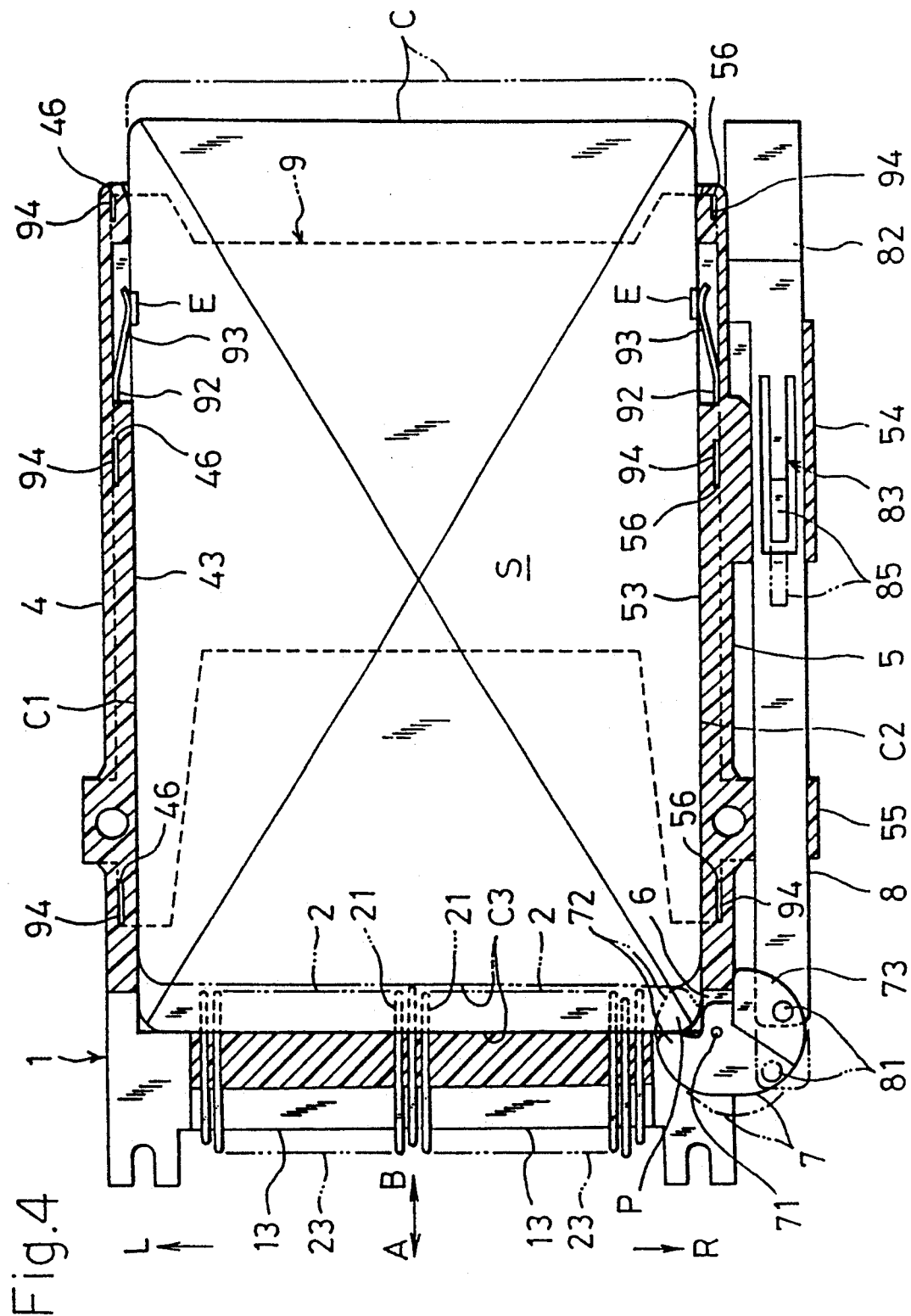
FIG. 4 is a schematic section view in plan elevation of the multipolar connector in FIG. 1.
Figure 5:
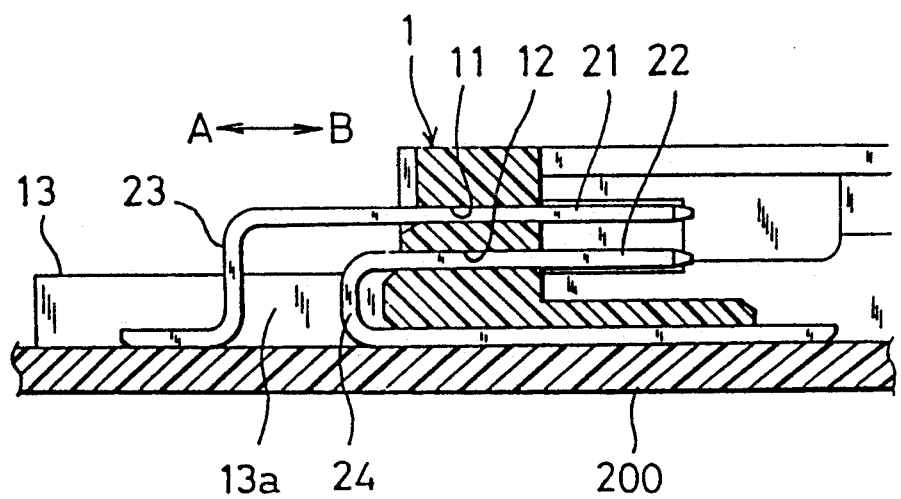
FIG. 5 is an enlarged vertical section view in side elevation of portions of the multipolar connector in FIG. 1.

A connector body 1 is made of an insulating synthetic resin. The connector body 1 has a plurality of holes 11, 12 which are formed at regular pitches and which are respectively located in two, upper and lower, rows. As shown in FIGS. 4 and 5, the plurality of holes 11, 12 respectively hold pin-shape contact pieces 21, 22 as projecting in the rearward direction B of the connector. In the pin-shape contact pieces 21, 22, portions thereof projecting from the connector body 1 in the forward direction A form terminal portions 23, 24, respectively. The connector body 1 has a comb-like support 13 of which teeth project in the forward direction A. As shown in FIG. 5, the terminal portions 23 in the upper row and the terminal portions 24 in the lower row are introduced, as bent, into spaces 13a between adjacent teeth of the comb-like support 13. The terminal portions 23 in the upper row are further bent horizontally in the forward direction A in the spaces 13a, and the terminal portions 24 in the lower row are further bent horizontally in the rearward direction B in the spaces 13a, so that the portions thus further bent underlie the underside of the connector body 1. As shown in FIG. 5, the terminal portions 23, 24 are soldered to a printed circuit board 200 at a circuit pattern (not shown) thereof with the surfaces of the terminal portions 23, 24 coming in contact with the surface of the printed circuit board 200. The plurality of pin-shape contact pieces 21 in the upper row and the plurality of pin-shape contact pieces 22 in the lower row form a contact-piece group 2.

Figure 1:
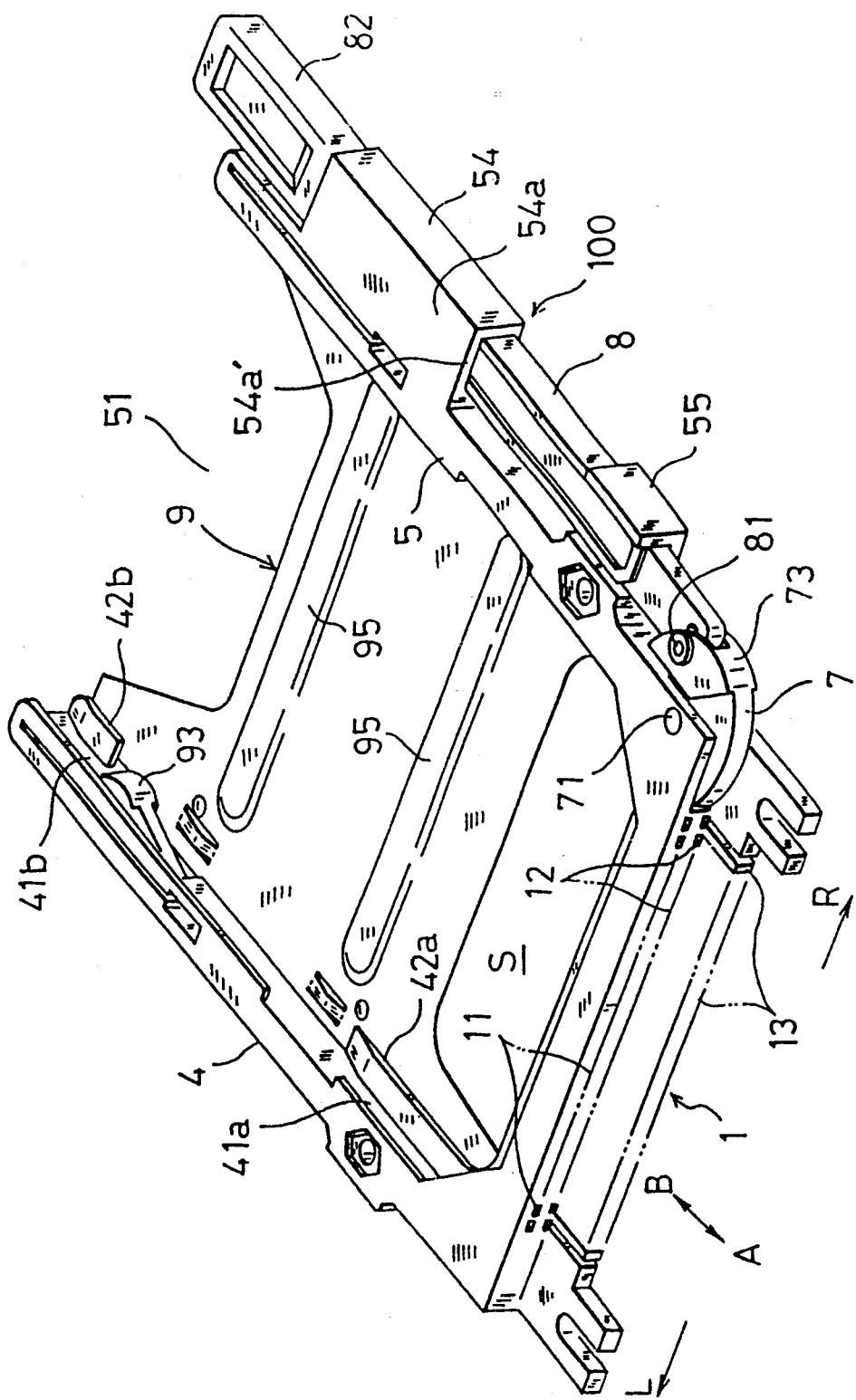
FIG. 1 is an appearance of a multipolar connector according to an embodiment of the present invention.
Figure 2:
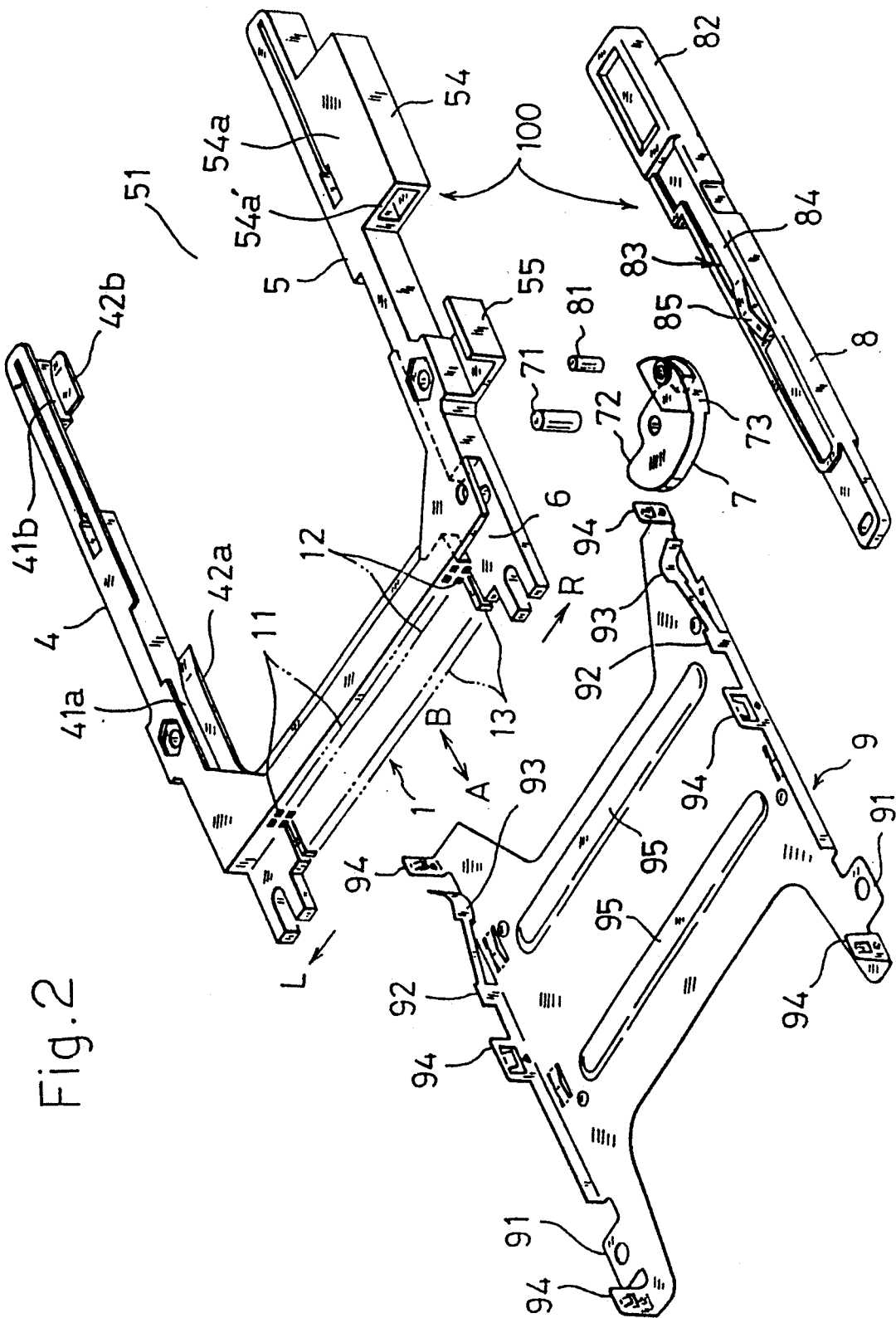
FIG. 2 is an exploded perspective view schematically illustrating the multipolar connector shown in FIG. 1.
Figure 3:
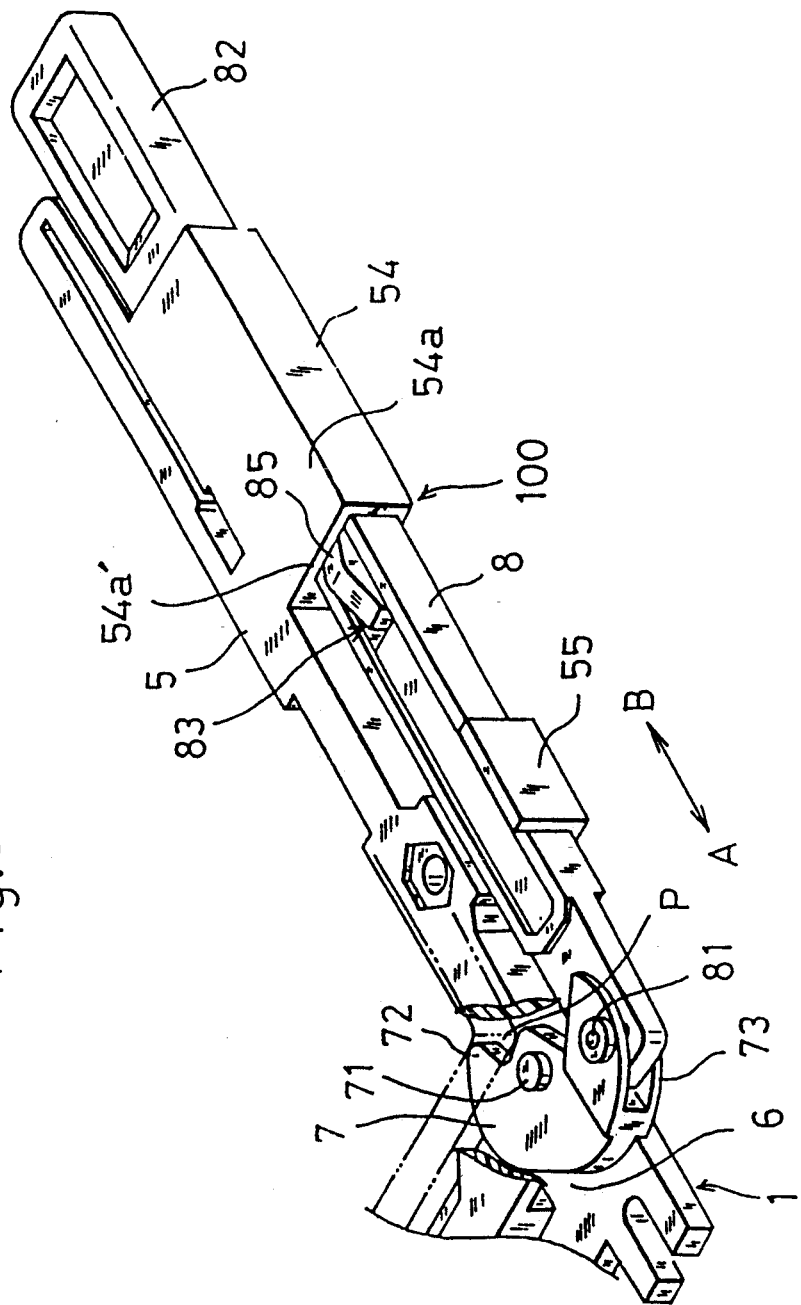
FIG. 3 is an enlarged perspective view of main portions, with portions broken away, of the multipolar connector in FIG. 1.

As shown in FIGS. 1 and 2, a guide member 4 extends in the rearward direction B from the rear end of the connector body 1 at the left side L thereof. The guide member 4 is provided in the inner side thereof with a front guide groove 41a and a rear guide groove 41b which extend in the back and forth direction of the connector. The front guide groove 41a has a lower wall 42a, and the rear guide groove 41b has a lower wall 42b. A guide member 5 extends in the rearward direction B from the rear end of the connector body 1 at the right side R thereof. The guide member 5 also has a front guide groove (not shown) and a rear guide groove (not shown) which are respectively symmetrical with respect to the front guide groove 41a and the rear guide groove 41b of the left-hand guide member 4. The distance L between the groove bottoms 43, 53 of the guide members 4, 5 in FIG. 4, is substantially equal to the width in the transverse direction of a card C such as an IC memory card or the like. Accordingly, when the lateral edges C1, C2 of the card C are fitted in the guide grooves 41a, 41b of the guide member 4 and the guide grooves (not shown) of the guide member 5, the card C can be securely guided in the back and forth direction of the connector with the edges C1, C2 of the card C prevented from being rickety by the guide grooves of the guide members 4, 5. Each of the guide members 4, 5 is slightly longer than the entire length of the card C in the back and forth direction thereof.

As shown in FIGS. 1, 2 and 4, the connector body 1 is provided in the end portion at the right side R thereof with a concave 6. This concave 6 is opened into a card setting space S (FIG. 4) formed between the left- and right-hand guide members 4 and 5. The concave 6 houses a cam 7 made of synthetic resin. The cam 7 is connected to the connector body 1 with a pin 71 such as a rivet. The cam 7 has a card pushing portion 72 as projecting therefrom, and an attaching portion 73 to which a lever 8 is connected, the attaching portion 73 being formed at the opposite side of the card pushing portion 72.

The cam 7 is swingable around the pin 71. When the cam 7 is swung, the card pushing portion 72 is adapted to project to a position (at a right-hand position in this embodiment) P of the front end side of the card setting space S, as shown by a virtual line in FIG. 4, or adapted to be moved in the forward direction A from this position P of the front end side of the card setting space S, as shown in a solid line in FIG. 4.

The lever 8 has the front end relatively rotatably connected to the attaching portion 73 of the cam 7 with a pin 81 such as a rivet.

The right-hand guide member 5 integrally has (i) a rearward lever holding portion 54 which is made in the form of a rectangular case and which projects rightward from the guide member 5, and (ii) a forward lever holding portion 55 having an U-shape section. The lever 8 as extending along the right-hand guide member 5 is slidably fitted, at two portions thereof, in the lever holding portions 54, 55. The lever 8 has an operating portion 82 disposed at a lateral side of and in the immediate vicinity of a card inserting/removing port 51 formed between the left-hand guide member 4 and the right-hand guide member 5.

Figure 8:
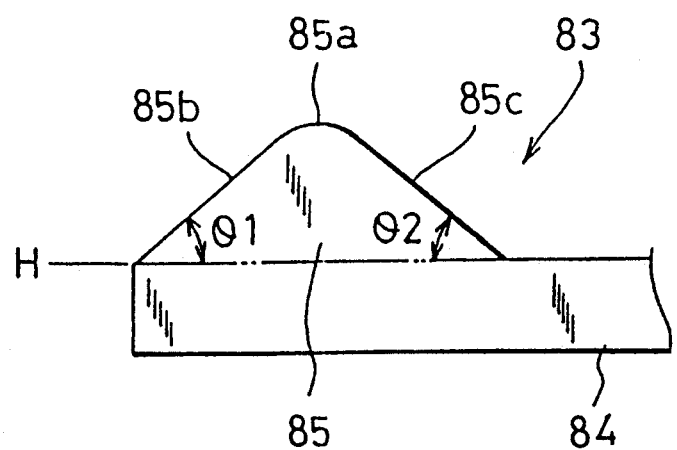
FIG. 8 is a view illustrating an engaging portion employed in the multipolar connector in FIG. 1.

The lever 8 is provided at the intermediate part in the back and forth direction thereof with an engaging portion 83. The engaging portion 83 has (i) a projecting piece 84 which extends in the forward direction A, and (ii) a mountain-shape expanding portion 85 integrally formed at the front end of the projecting piece 84. The unit of the projecting piece 84 and the expanding portion 85 is molded integrally with the lever and made in the form of a cantilever as if surroundings thereof are hollowed out from the lever 8. As understood from FIG. 8, the expanding portion 85 has a top 85a, a forward inclined surface 85b and a rearward inclined surface 85c, and the forward and rearward inclined surface 85b, 85c respectively have angles of elevation $\theta_1$, $\theta_2$ which are approximately equal to each other and which are not so great with respect to a virtual horizontal plane H.

Figure 6:
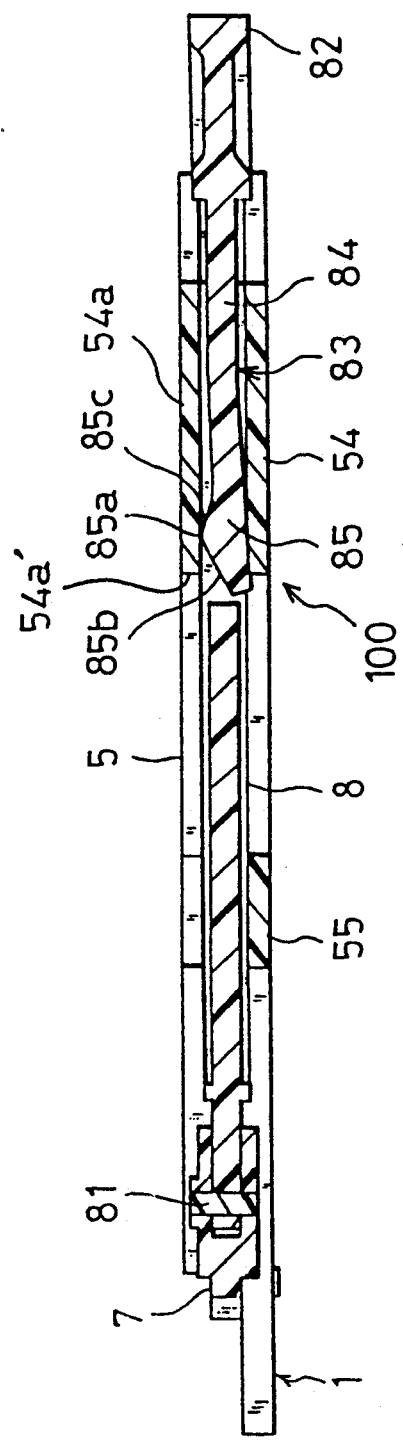
FIGS. 6 and 7 are schematic vertical section view in side elevation of main portions of the multipolar connector in FIG. 1.
Figure 7:
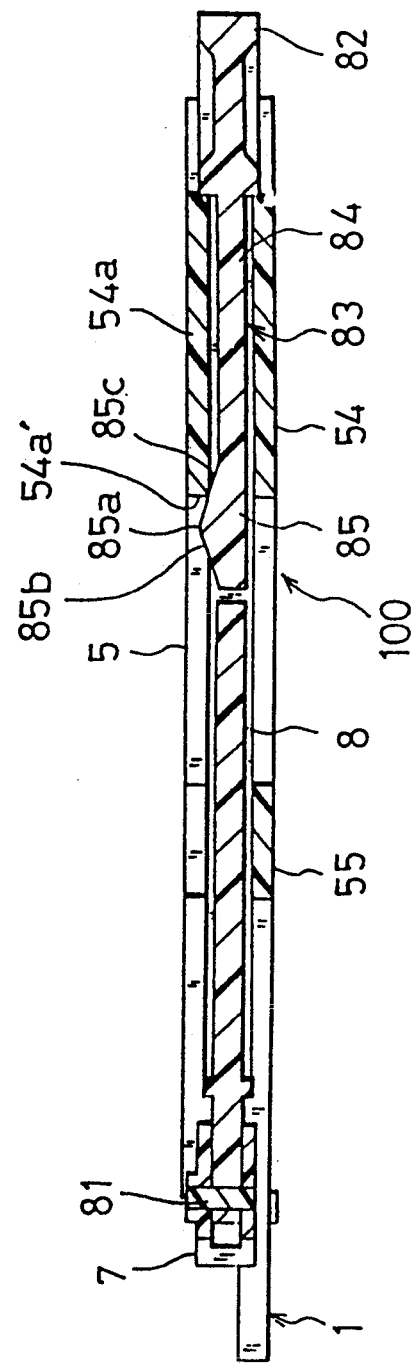

When the card pushing portion 72 of the cam 7 is moved in the forward direction A from the front-side position P of the card setting space S so that the lever 8 is pushed out in the rearward direction B, the expanding portion 85 is pulled into the rearward lever holding portion 54 and underlies the upper wall portion 54a thereof as shown in FIG. 6. This causes the projecting piece 84 to be resiliently displaced and downwardly bent due to resiliency thereof. On the other hand, when the lever 8 is pushed in the forward direction A so that the card pushing portion 72 of the cam 7 projects into the front-side position P of the card setting space S, the overlaping state of the upper wall portion 54a on the expanding portion 85 is released as shown in FIG. 7. Accordingly, the rearward inclined surface 85c of the expanding portion 85 is engaged with the front edge 54a' of the upper wall portion 54a of the rearward lever holding portion 54. This causes the projecting piece 84 is resiliently reset. The upper wall portion 54a of the rearward lever holding portion 54 discussed in the foregoing, forms a portion to be engaged which serves as a counter part of the engaging portion 83. The engaging portion 83 and the portion to be engaged (i.e., the upper wall portion 54a of the rearward lever holding portion 54) form a locking mechanism 100. In the following description, the portion to be engaged will be designated by the reference numeral 54a.

In FIGS. 1, 2, 3, 4, a frame 9 is provided at the lateral edges thereof with flange pieces 91. The frame 9 is also provided at predetermined portions of the lateral edges thereof with upwardly standing projecting pieces 92. Earth contact pieces 93 are integrally formed at the projecting pieces 92. The frame 9 is also provided at a plurality of portions of the lateral edges thereof with upwardly standing engagement pawls 94. The frame 9 is disposed as extending between the left- and right-hand guide members 4, 5 at the undersides thereof. More specifically, the engagement pawls 94 are inserted, from below, into slender grooves 46, 56 respectively formed in the left- and right-hand guide members 4, 5 so that the guide members 4, 5 hold the pawls 94 (FIG. 4). The earth contact pieces 93 project into the card setting space S from the lateral sides thereof. The frame 9 has a plurality of ribs 95 to enhance the flexural rigidity of the frame 9.

The card C is provided in the front end surface thereof with pin inserting holes (not shown) which house a contact-piece group corresponding to the contact-piece group 2 of the connector body 1. The card C is also provided at the lateral sides thereof with earth terminals E (FIG. 4).

According to the arrangement above-mentioned, when, with the lateral edges C1, C2 of the card C guided by the guide grooves 41a, 41b of the left-hand guide member 4 and the guide grooves (not shown) of the right-hand guide member 5, the card C is inserted into the card setting space S so that the contact-piece group of the card C comes in resilient contact with the contact-piece group 2 of the connector body 1, the card C is set at the proper position in the card setting space S. At this time, the card pushing portion 72 of the cam 7 is moved in the forward direction A from the card setting space S and the lever 8 is pushed out in the rearward direction B (shown by the solid line in FIGS. 1 and 4 and also shown in FIG. 6).

For removing the card C from the connector, the operating portion 82 is pushed with a finger of the user to push the lever 8 in the forward direction A, causing the cam 7 to be swung around the pin 71. Accordingly, the cam 7 is swung so that the card pushing portion 72 projects into the front-side position P of the card setting space S as shown by the virtual line in FIG. 4. At this time, the front end surface C3 of the card C is pushed by the card pushing portion 72. Accordingly, while guided by the left- and right-hand guide members 4, 5, the card C is pushed out in the rearward direction B by a distance corresponding to the projecting distance of the card pushing portion 72 into the card setting space S.

When the lever 8 is pushed in the forward direction A, the relation between the expanding portion 85 of the engaging portion 83 and the portion to be engaged 54a of the rearward lever holding portion 54 is changed from the overlaping state in FIG. 6 to the engagement state in FIG. 7. When the portion to be engaged 54a overlaps the expanding portion 85 of the engaging portion 83, the projecting piece 84 of the engaging portion 83 is resiliently displaced and downwardly bent. Accordingly, at the moment that the relation between the portion to be engaged 54a and the expanding portion 85 is changed from the overlaping state to the engagement state, the projecting piece 84 is resiliently reset. Such a momentary change in state is transmitted, as a pleasant click feel, to the hand through the lever 8.

When the expanding portion 85 and the portion to be engaged 54a are engaged with each other as shown in FIG. 7, this prevents the lever 8 from being moved in the back and forth direction of the connector, causing the lever 8 and the cam 7 not to be freely moved. This eliminates an unpleasant clacking noise which may be produced by a free movement of the lever 8 in the back and forth direction or a free swing of the cam 7.

When the card C is then set next time, the card pushing portion 72 which has projected into the card setting space S, is pushed by the front end surface C3 of the card C and therefore moved in the forward direction A away from the card setting space S, causing the lever 8 to be pushed out in the rearward direction B. When the lever 8 is pushed in the rearward direction B in such a manner, the rearward inclined surface 85c of the expanding portion 85 of the engaging portion 83 is slided on the front edge 54a' of the portion to be engaged 54a. Accordingly, the projecting piece 84 is downwardly bent and the expanding portion 85 of the engaging portion 83 underlies the portion to be engaged 54a.

When the card C is pushed into the card setting space S in the forward direction A, the earth contact pieces 93 of the frame 9 are rubbed with the lateral sides of the card C and come in contact with the earth terminals E disposed thereat.

In this embodiment, the frame 9 is useful in preventing the guide members 4, 5 made of synthetic resin from being outwardly turned, because the engagement pawls 94 of the frame 9 are inserted into the slender grooves 46, 56 in the left- and right-hand guide members 4, 5.

Figure 9:
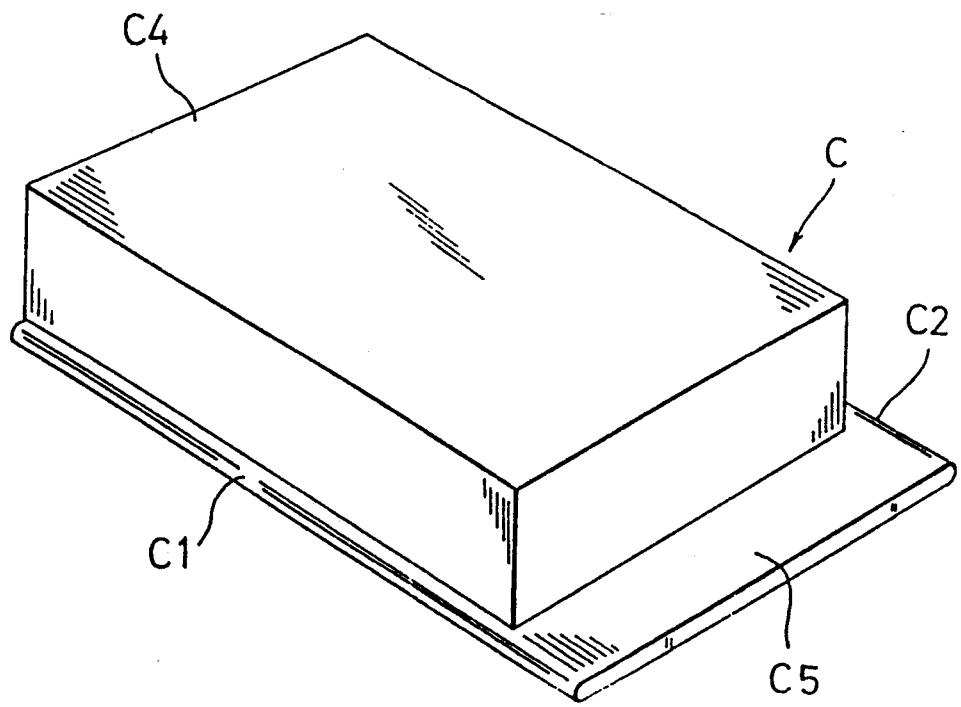
FIG. 9 is a schematic perspective view of a modification of a card.

In this embodiment, since the frame 9 is disposed as extending between the left- and right-hand guide members 4, 5 at the undersides thereof, an opening is formed between the left- and right-hand guide members 4, 5 at the tops thereof. This enables the multipolar connector of the embodiment to be applied to a card C schematically shown in FIG. 9. The card C in FIG. 9 has a bulky portion C4 incorporating, for example, a mass storage such as a hard disk. If the card setting space in a multipolar connector is closed, at the top and underside thereof, by frames or the like, the card C in FIG. 9 cannot be applied to such a multipolar connector, because the bulky portion C4 gets in the way. However, such a card can be applied to the multipolar connector of the embodiment. More particularly, when the plate-like main body C5 of the card C in FIG. 9 has a thickness substantially equal to that of the card such as an IC memory card mentioned earlier, the lateral edges C1, C2 of the main body C5 can be fitted in the guide grooves of the left- and right-hand guide members 4, 5 with the bulky portion C4 passing through and upwardly projecting from the opening formed between the tops of the guide members 4, 5. Thus, the bulky portion C4 does not get in the way.

In the embodiment above-mentioned, the engaging portion 83 comprises the projecting piece 84 extending in the forward direction A and the mountain-shape expanding portion 85 integrally formed at the front end of the projecting piece 84. That is, the unit of the projecting piece 84 and the expanding portion 85 is molded integrally with the lever and made in the form of a cantilever as if surroundings thereof are hollowed out from the lever 8. Accordingly, the engaging portion 83 can be formed integrally and simultaneously with the formation of the lever 8. However, the engaging portion may be made independently from the lever, and then attached thereto. For example, the engaging portion may be formed by a leaf spring having (i) a projecting piece corresponding to the projecting piece 84 and (ii) a mountain-shape expanding portion which corresponds to the expanding portion 85 and which is formed at the front end of the projecting piece by bending the same. Further, the engaging portion may be formed by a steel ball held at a fixed position at either the lever side or the side of the upper wall portion 54a of the rearward lever holding portion 54. In this case, the other side may have a concave which the steel ball is adapted to overlap as fitted therein. That is, provision may be made such that, when the lever is pushed in the forward direction A, the steel ball is fitted in and overlaps the concave and that, when the lever is pushed out in the rearward direction B, the steel ball comes off from the concave. In this case, provision may be made such that the steel ball is resiliently biased by a spring and that the steel ball is momentarily pushed in the concave by the resilient force of the spring.

In the embodiment above-mentioned, the engaging portion 83 is formed at the side of the lever 8 and the portion to be engaged 54a is formed at the side of the rearward lever holding portion 54. However, the engaging portion may be formed at the side of the rearward lever holding portion and the portion to be engaged may be formed at the side of the lever.

What is claimed is:

1. In a multipolar electrical connector having: a connector body; a contact-piece group disposed in said connector body; left- and right-hand guide members respectively projecting from the left- and right-hand ends of said connector body in the rearward direction of said connector; guide grooves formed in said left- and right-hand guide members and adapted to guide, in the back and forth direction of said connector, a card with the lateral edges thereof fitted in said guide grooves, said card being provided at the front end thereof with a contact-piece group corresponding to said contact-piece group of said connector; and a frame disposed as extending between said left- and right-hand guide members at the undersides thereof, said multipolar electrical connector comprising:
a cam swingably pin-connected to said connector body;
a card pushing portion formed at a part of said cam and adapted to go in and out from a position of the front end side of a card setting space formed between said left- and right-hand guide members when said cam is swung;
a lever disposed along one of said left- and right-hand guide members and having the front end relatively rotatably connected to said cam at other part thereof than said first-mentioned part;
a lever holding portion formed at said one guide member along which said lever extends, the intermediate portion of said lever being slidably fitted in said lever holding portion;
a resiliently displaceable engaging portion disposed at the side of said lever; and
a portion to be engaged disposed at the side of said lever holding portion, said portion to be engaged being adapted such that, when said lever is pushed out in the rearward direction, said portion to be engaged overlaps said engaging portion, causing said engaging portion to be resiliently displaced and that, when said lever is pushed in the forward direction, the overlaping state of said portion to be engaged on said engaging portion is released to allow said engaging portion to be resiliently reset.

2. A multipolar electrical connector according to claim 1, wherein the engaging portion and the portion to be engaged form a locking mechanism arranged such that, when the lever is pushed out in the rearward direction of said connector, at least one of said engaging portion and said portion to be engaged is resiliently displaced and overlaps the other portion, and that, when said lever is pushed in the forward direction of said connector, the overlaping relation between said engaging portion and said portion to be engaged is released so that said at least one of said engaging portion and said portion to be engaged is resiliently reset and engaged with said other portion.

3. A multipolar electrical connector according to claim 2, wherein the engaging portion is formed by a leaf spring having a projecting piece and a mountain-shape expanding portion formed at the front end of said projecting piece by bending the same.

4. A multipolar electrical connector according to claim 2 wherein the engaging portion is formed by a steel ball, and the portion to be engaged is made in the form of a concave which said steel ball is adapted to overlap as fitted therein, said steel ball being so resiliently biased as to fit in said concave.

5. A multipolar electrical connector according to claim 2, wherein
the connector body has a comb-like support which projects in the forward direction of said connector,
an opening is formed between the tops of the left- and right-hand guide members, and
terminal portions respectively extending from pin-shape contact pieces forming the contact-piece group, are introduced into spaces between adjacent teeth of said comb-like support and bent therein so that the parts of said terminal portions thus bent underlie the underside of said connector body, said terminal portions being soldered to a printed circuit board at a circuit pattern thereof with the surfaces of said terminal portions coming in contact with the surface of said printed circuit board.

6. A multipolar electrical connector according to claim 2, wherein the engaging portion comprises a projecting piece extending in the forward direction of said connector and a mountain-shape expanding portion integrally formed at the front end of said projecting piece, the unit of said projecting piece and said expanding portion being molded integrally with the lever and made in the form of a cantilever as if surroundings thereof are hollowed out from said lever.

7. A multipolar electrical connector according to claim 6, wherein the mountain-shape expanding portion has a top, a forward inclined surface and a rearward inclined surface which hold said top therebetween, and said forward and rearward inclined surfaces have angles of elevation which are approximately equal to each other.

8. A multipolar electrical connector according to claim 2, wherein
the left- and right-hand guide members and the connector body are made of synthetic resin, the frame is provided at a plurality of portions of the lateral edges thereof with upwardly standing pawls, and said pawls are inserted into slender grooves formed in said left- and right-hand guide members.

9. A multipolar electrical connector according to claim 8, wherein the earth contact pieces extend from the projecting pieces in the rearward direction of said connector.

10. In a multipolar electrical connector having: a connector body; a contact-piece group disposed in said connector body; left- and right-hand guide members respectively projecting from the left- and right-hand ends of said connector body in the rearward direction of said connector; guide grooves formed in said left- and right-hand guide members and adapted to guide, in the back and forth direction of said connector, a card with the lateral edges thereof fitted in said guide grooves, said card being provided at the front end thereof with a contact-piece group corresponding to said contact-piece group of said connector; and a frame disposed as extending between said left- and right-hand guide members at the undersides thereof, said multipolar electrical connector comprising:

a cam swingably pin-connected to said connector body;

a card pushing portion formed at a part of said cam and adapted to go in and out from a position of the front end side of a card setting space between said left- and right-hand guide members when said cam is swung;

a lever disposed along one of said left- and right-hand guide members and having the front end relatively rotatably connected to said cam at other part thereof than said first-mentioned part;

a lever holding portion formed at said one guide member along which said lever extends, the intermediate portion of said lever being slidably fitted in said lever holding portion;

a resiliently displaceable engaging portion disposed at the side of said lever holding portion; and a portion to be engaged disposed at the side of said lever, said portion to be engaged being adapted such that, when said lever is pushed out in the rearward direction, said engaging portion overlaps said portion to be engaged, causing said engaging portion to be resiliently displaced and that, when said lever is pushed in the forward direction, the overlaping state of said engaging portion on said portion to be engaged is released to allow said engaging portion to be resiliently reset.

11. A multipolar electrical connector according to claim 10, wherein the engaging portion and the portion to be engaged form a locking mechanism arranged such that, when the lever is pushed out in the rearward direction of said connector, at least one of said engaging portion and said portion to be engaged is resiliently displaced and overlaps the other portion, and that, when said lever is pushed in the forward direction of said connector, the overlaping relation between said engaging portion and said portion to be engaged is released so that said at least one of said engaging portion and said portion to be engaged is resiliently reset and engaged with said other portion.

12. In a multipolar electrical connector having: a connector body; a contact-piece group disposed in said connector body; left- and right-hand guide members respectively projecting from the left- and right-hand ends of said connector body in the rearward direction of said connector; guide grooves formed in said left- and right-hand guide members and adapted to guide, in the back and forth direction of said connector, a card with the lateral edges thereof fitted in said guide grooves, said card being provided at the front end thereof with a contact-piece group corresponding to said contact-piece group of said connector; and a frame disposed as extending between said left- and right-hand guide members at the undersides thereof, said multipolar electrical connector comprising:

projecting pieces upwardly standing from the lateral edges of the frame; and earth contact pieces so formed at said projecting pieces as to project into a card setting space between said left- and right-hand guide members from the lateral sides of said space, said earth contact pieces being adapted to come in contact with earth terminals of a card at the lateral sides thereof.

* * * * *